March 8, 1938.  E. DAVID ET AL  2,110,416
FISH CUTTING MACHINE
Filed Nov. 30, 1935   3 Sheets-Sheet 3
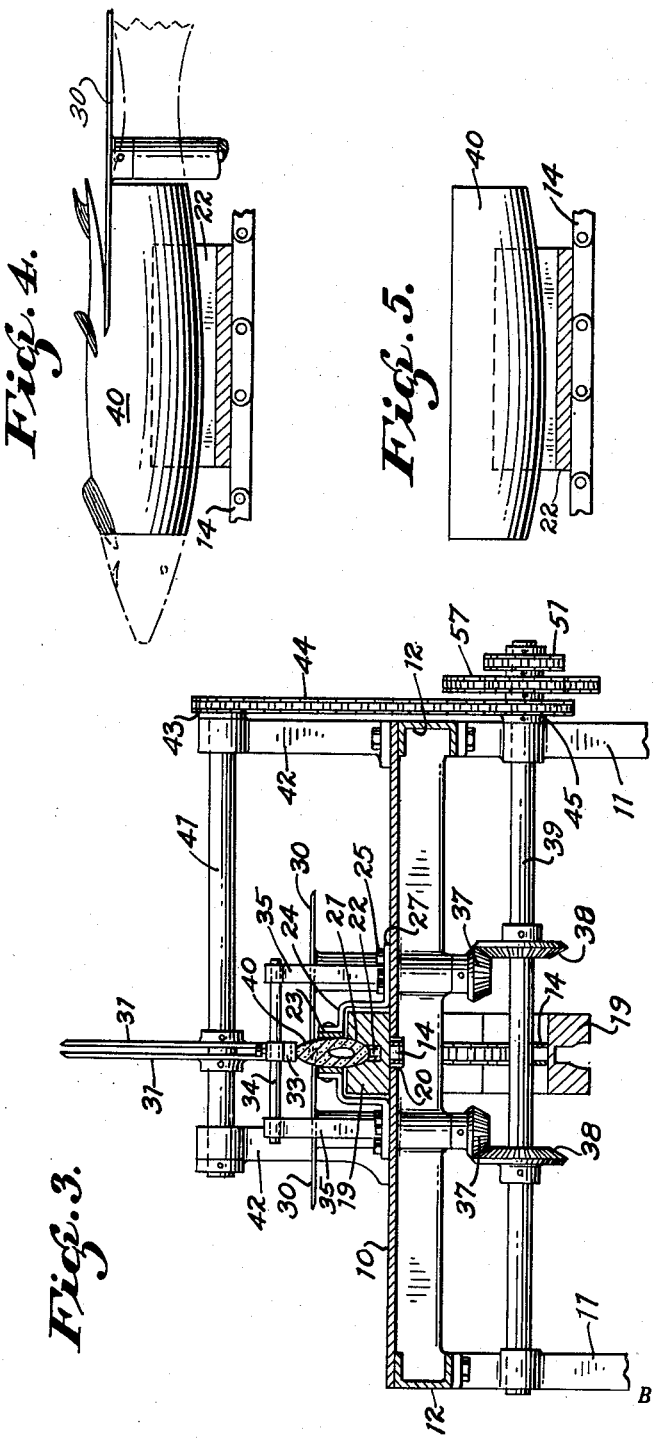
INVENTOR.
EDWARD DAVID &
STEPHEN SZODY.
BY Jas. M. Naylor
ATTORNEY Patented Mar. 8, 1938

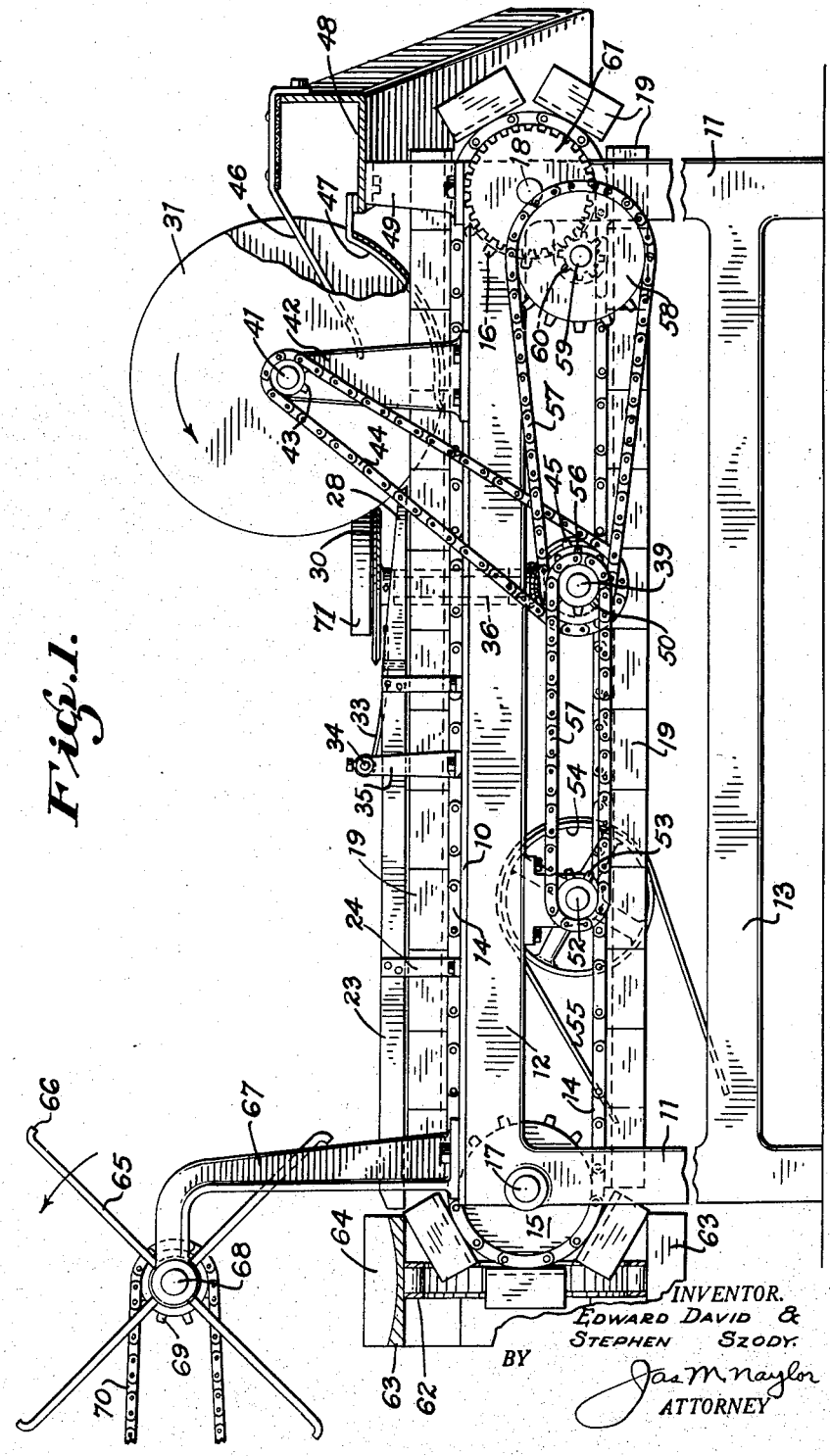

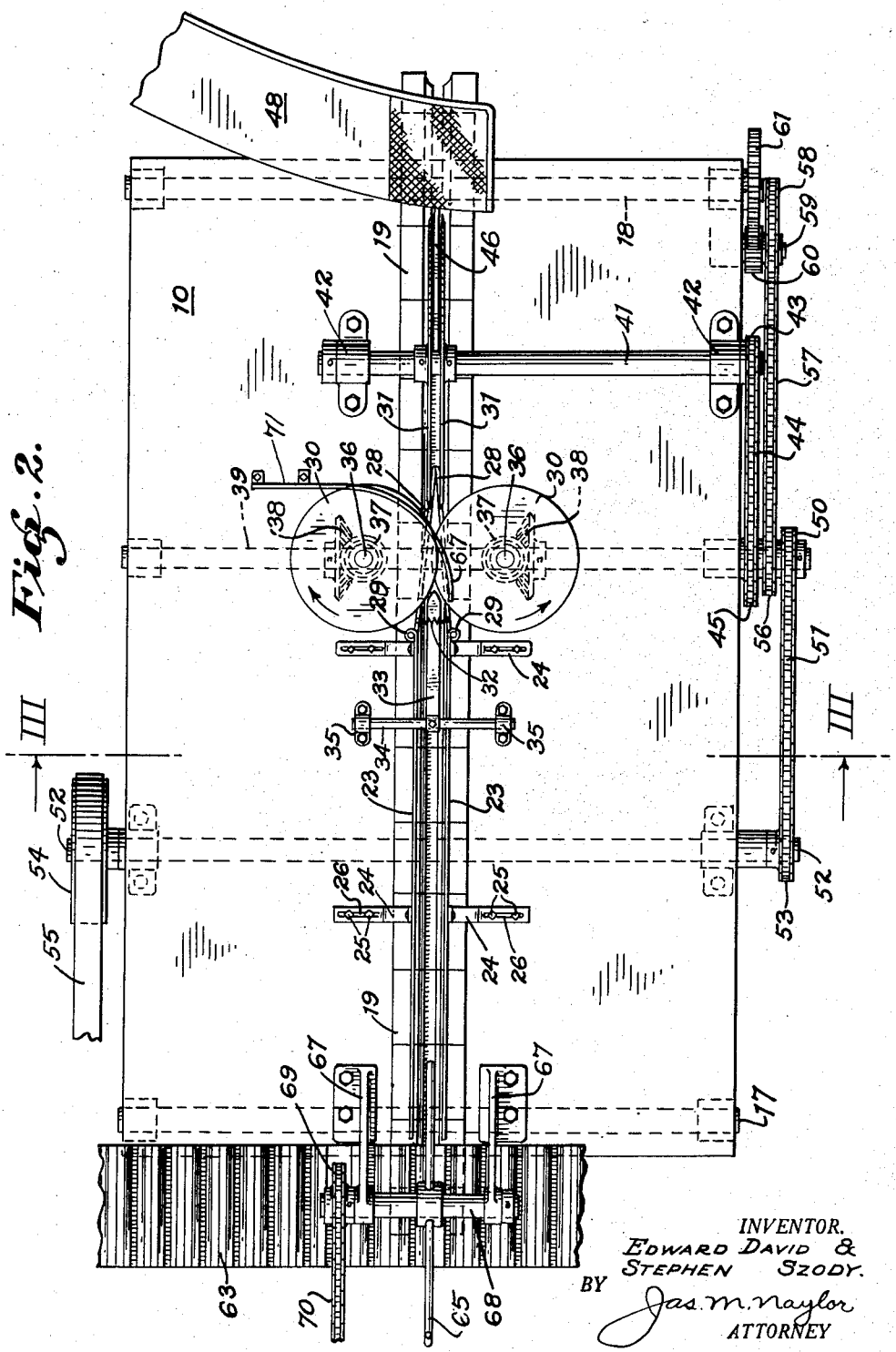

2,110,416

UNITED STATES PATENT OFFICE 2,110,416

FISH-CUTTING MACHINE

Edward David, Carmel, and Stephen Szody, Seaside, Calif.

Application November 30, 1935, Serial No. 52,394

3 Claims. (Cl. 17—4)

This invention pertains to fish cutting machines and has for one of its objects the provision of means for the cutting of fillets from fish which have had preliminary preparation by other cutting devices.

In particular this invention relates to a machine which is adapted to slice only the finest and boneless meat from fish preparatory to the smoking and canning of such pieces. In these respects it is to be distinguished from those machines which cut and otherwise partially prepare whole fish for canning.

While in the following description reference will be made to the treatment of Monterey sardines, it will be appreciated that our device may be adjusted and regulated for use with other varieties and sizes of fish without departing from the spirit of the invention. It will also be appreciated that while our machine has been developed and designed primarily for use as a part of equipment used in the preparation of fish for canning, that nevertheless the principle of the invention and the machine disclosed herein may be readily adapted for use in the ordinary commercial handling of fish where it is desired to cut the select portions of fish rapidly and efficiently preparatory to the sale thereof.

Before describing our machine in more specific detail it is worthy of note that our device has been developed to handle fish which have had their heads, tails and viscera removed by other mechanisms. In other words, when the fish is introduced into our cutter it consists of only the meaty portion of the fish, the backbone and belly as a whole.

The cut fish are introduced into our machine by means of a spider timed to push cut fish in the condition just described, from an endless conveyor passing through the preliminary cutting means and at right angles to the conveying means of our device. Thereafter, the fish are conveyed through the various mechanisms about to be described. Throughout the course of treatment by our device the fish are held with their bellies uppermost.

We employ an endless conveyor which consists of a series of wooden blocks having a trough-like construction with the concavity or slot extending longitudinally of the conveyor means, in which blocks the fish are retained with the tail end of the piece foremost.

Being thus retained the fish progress toward a pair of overlapping horizontally disposed rotary knives which cut the belly section of the fish longitudinally and then the remaining section of the fish moves forward to pass under and through a pair of parallel vertically disposed rotary knives which make a pair of longitudinal cuts to separate the fillets from the backbone, spring tensioned pressure means being employed to insure proper delivery of these sections of the fish to the respective cutters and to maintain proper alignment. From thence the fillets progress to a point of discharge onto any suitable conveying means and the backbone sections are guided out of the vertical cutters into a chute for disposal.

With this statement of objects and general description in mind we proceed to consideration of the drawings and a more detailed description of the parts of our device. In the drawings:

Figure 1 is a side elevational view of our invention.

Figure 2 is a top plan view of our machine.

Figure 3 is a section taken along the line 3—3 of Figure 2.

Figure 4 is a schematic view of a fish during the horizontal cutting operation.

Figure 5 is a side elevational view showing the shape of the fish after the cutting operation shown in Figure 4, and Figure 6 is a schematic view showing the final or vertical longitudinal cutting operation.

Our device is mounted on a table 10 having legs 11. Upper and lower bars 12 and 13, respectively, extend longitudinally between the legs for strengthening purposes, and the former also serve as a mount for certain elements to be described.

An endless chain 14 runs lengthwise of the table 10, being engaged by sprockets 15 and 16, disposed at opposite ends of the table and keyed to shafts 17 and 18, respectively, which are suitably journaled in the legs 11. Wooden blocks 19, secured to the chain 14, form the conveying means employed in moving the fish through our machine. As illustrated in Figure 3 of the drawings, the chain 14 passes through a medial slot 20 in the table 10 while the blocks 19 slide along its top surface.

The shape of the blocks 19 is illustrated to best advantage in Figure 3, from which it will be noted that they have longitudinally extending concavities 21, designed to receive the back of the fish (see Figures 4 and 5), below which there is a trough 22 to receive the edges of the vertical knives to be later described.

These blocks are so connected to the chain 14 that when the latter is moving on a horizontal plane they fit end to end to form a continuous moving trough into which the fish are slid in readiness for the cutting operation.

As a means for insuring delivery of the fish in proper alignment to the first of the cutting operations we employ the adjustable guides 23, the distance between which may be varied to accommodate fish of different thicknesses. These guides 23 are mounted on bracket 24 secured to table 10 (see Figure 3) by bolts 25 passing through slots 26 in the feet 27. By unscrewing bolts 25 the guides 23 may be moved inwardly or outwardly for the adjustment desired.

Extensions 28 of the guides 23 are hinged thereto, as at 29, and project forwardly under the knives 30 to a point just short of the cutting edge of knives 31 and serve to retain the fish in proper alignment during the first cutting operation and insure delivery to the second cutting operation. As indicated in Figure 2 of the drawings, these extensions taper downwardly at their free ends and spring 32 urges them together to define a restricted passageway through which the fish must pass during the cutting operations.

A flat spring 33, secured to the rod 34 supported by the brackets 35, presses downwardly on the fish to hold them securely while the first or belly cut is being made and prevent accidental displacement.

The horizontally disposed knives 30 are keyed to the stub shafts 36 which are suitably journaled in the table 10 and (see Figures 3 and 4) their edges are set to overlap to effect a complete cut. These knives are rotated by the engagement of bevel gears 37, keyed to shaft 36, with corresponding gears 38 on main shaft 39, the drive of which will be hereinafter described.

The cut effected by knives 30 is shown to best advantage in Figure 4 of the drawings, in which a fish is shown moving tail end foremost into the knives which shear off the belly, fins and undesirable dark meat, leaving the fish 40 in the condition illustrated in Figure 5.

The undesirable portions cut away during this operation may be discharged from the machine in any number of ways. As an expedient we show a guide bar 71 curved across the medial line of the machine and adapted to move the trimmings to one side of the cutting elements. As a further detail of construction it may prove practical to use a mechanical conveyor or a trough and stream of water to dispose of the same.

The fish, it will be appreciated, pass at once to knives 31 which effect the final cut, the second cutting operation commencing on the tail end of the fish before the first has been completed.

The vertically disposed knives 31 are keyed to shaft 41 journaled in the posts 42 secured to the table 10. A sprocket 43, at the end of shaft 41, engaged by the chain 44, driven by sprocket 45 on main shaft 39, rotates the knives in a counter-clockwise direction and downwardly into the oncoming fish.

Since it is desirable to trim the fillets close to the backbone, the knives 31 are normally adjusted on shaft 41 sufficiently far apart to permit the backbone to pass between them. The fillets, it will be understood pass on either side of them. It will also be noted that as the knives 31 extend downwardly into slots 22 into blocks 19, there is a complete severance of the fillets from the remainder of the fish.

At the completion of this cutting operation the fillets fall away from the knives 31 onto the top of blocks 19 and are carried thereby to the end of the machine from whence they are dropped to any conventional conveyor means (not shown) for delivery to the next operation in the processing beyond the scope of the subject matter of the present invention.

The backbones, on the other hand, are removed from the machine by means of a pair of strippers 46 and 47 set between the knives 31. (See Figure 1.) These strippers are attached to a discharge chute 48 supported on a bracket 49 at the end of table 10. Stripper 46, uppermost of the two, is disposed downwardly between the knives at approximately a 45° angle to serve as a buffer against which the backbone section of the fish is thrown by the momentum imparted to it by the knives 31. The lower stripper, 47, is spaced apart from the upper one and, after projecting outwardly on a horizontal plane from the chute 48 to a point proximate the cutting edge of knives 31, is arcuately curved downwardly to a point just above the bottom of slot 22 in blocks 19, its function being to insure removal of the backbone sections of the fish and overcome any tendency of sticking as well as to guide the same into chute 48.

Thus it will be noted that with the aid of the two strippers the centrifugal force of the rotary knives 31, plus pressure of oncoming fish on blocks 19, will be sufficient to cause the backbone sections to move into chute 48 by which they will be carried to some other part of the plant for rendition into useful by-products.

We have explained that the knives 30 and 31 are rotated through certain connections with shaft 39. This shaft, in turn, is rotated by the engagement of gear 50, carried thereby, with chain 51 which passes over a sprocket 52 on shaft 53. A pulley 54, on this latter shaft, receives its momentum from any suitable source of power (not shown) through belt 55. Likewise, a sprocket 56 on shaft 39 drives chain 57 which, by engagement with sprocket 58 on shaft 59 and through the means of gears 60 and 61, the latter on shaft 18, causes the chain 14 to revolve about sprockets 15 and 16.

As illustrated in Figures 1 and 2 of the drawings, our device is positioned at right angles to the conveyor means running through the device which removes the heads, tails and viscera. While this particular conveyor is conventional and therefore forms no part of our invention, a brief description of it will aid in a better understanding of the construction and operation of our device. It consists of a chain 62 each link of which carries a transversely disposed wooden block 63 having a fish receiving slot such as 64.

The delivery mechanism forming a part of our machine consists of the spider 65 which is superposed above the conveyor 62 (see Figure 1). The spider is mounted on a shaft 66, journaled in posts 67 which are bolted onto table 10. The upper ends of posts 67 are bent outwardly in the form of a goose neck so that the axis of the spider 65 is in perpendicular alignment with the chain 62. Rotation of the spider, in the direction indicated by the arrows in Figure 1, is accomplished through the provision of a sprocket 69, on shaft 68, which is engaged by a chain 70 connected to any suitable source of power (not shown).

Figures 1 and 2 of the drawings illustrate the relationship of the arms of the spider 65 to the blocks 63 on conveyor chain 62 and indicate that the arrangement of parts is such that the arms of the spider 65 are designed and adapted to be timed to sweep through the blocks 63, pushing fish carried thereby onto blocks 19 in the conveyor mechanism feeding our machine. To insure against any breaking or tearing of the fish the ends of the arms of the spider 65 are bent rearwardly, as at 66, so that the portion thereof striking the fish is relatively smooth and unbroken. Any tendency of the arms of the spider 65 to crowd or damage the fish 40 while sweeping through blocks 63 may be corrected by simply adjusting the mount of same to pitch the axis of shaft 68 at a slight angle to chain 62 whereby the arms will enter the slot 64 at the far wall of same and leave adjacent the near wall.

With the foregoing description in mind the operation of our machine will be readily understood. The fish 40 is pushed from conveyor 62 by the spider 65, tail end foremost, into the concavities 21 of blocks 19. Guides 23 keep the fish in line during the course of its movement toward the cutting mechanisms and flat spring 33 presses fish 40 downwardly into concavity 21 in block 19 so that the belly cut will be exact. Passing under knives 30 the fish 40 is guided into vertical knives 31 by the spring tensioned extensions 28 so that when the fillet cut is made longitudinally of the fish the backbone will pass between the knives 31 and the fillets will fall to either side thereof. From this point the fillets are conveyed, on the surface of blocks 19, to the end of the machine from whence they fall onto any conventional conveyor for transportation to other parts of the plant and additional treatment. Strippers 46 and 47 insure the removal of the backbone pieces from the machine and guide them into a discharge chute 48.

It will be appreciated that our machine is subject to many modifications and that adequate provision has been made for such adjustments as may be necessitated through the handling of various species of fish. Since only a preferred form of the invention has been illustrated we do not wish to be limited to that form only but only by the scope of the appended claims.

Having thus described our invention, what we claim and desire to secure by grant of Letters Patent is:

1. In a fish cutting machine, the combination of an endless conveyor having a longitudinal fish receiving concavity therein, cutting means for removing the belly portions of the fish on said conveyor, cutting means for separating the fillets from the backbone of said fish, and expansible guide means between said first named cutting means and said conveyor, said guide means co-operating with said conveyor and said first named cutting means to retain the fish in alignment during the first named cutting operation and for delivery of the fish to the action of said second named cutting means.

2. In a fish cutting machine, the combination of an endless conveyor having a longitudinal fish receiving concavity therein, cutting means for removing the belly portions of the fish on said conveyor, cutting means for separating the fillets from the backbone of said fish, and guide means above and on either side of the concavity in said endless conveyor the discharge ends of which are expansible and cooperate with said conveyor and said first-named cutting means to retain the fish in alignment during the first-named cutting operation and for delivery of the fish to the action of said second-named cutting means.

3. In a fish cutting machine, the combination of an endless conveyor having a longitudinal fish receiving concavity therein, cutting means for removing the belly portions of the fish on said conveyor, cutting means for separating the fillets from the backbone of said fish, and guide means above and on either side of the concavity in said endless conveyor with their discharge ends extending under said first-named cutting means, the discharge ends of said guide means being also expansible and cooperating with said conveyor and said first-named cutting means to retain the fish in alignment during the first-named cutting operation and for delivery of the fish to the action of said second-named cutting means.

EDWARD DAVID.
STEPHEN SZODY.